United States Patent [19]

Kuze et al.

[11] Patent Number: 4,595,715

[45] Date of Patent: Jun. 17, 1986

[54] ORIENTED POLYESTER FILM CONTAINING CALCIUM CARBONATE AND KAOLINITE

[75] Inventors: Katsuaki Kuze; Yujiro Matsuyama, both of Otsu; Kozo Maeda, Takatsuki; Takeshi Ota, Tsuruga; Masahiro Kobayashi, Kyoto; Tsuyoshi Hongo, Otsu; Osamu Makimura, Ogaki, all of Japan

[73] Assignees: Toyo Boseki Kabushiki Kaisha T/A Toyobo Co., Ltd., Osaka; Nippon Magphane Kabushiki Kaisha, Tokyo, both of Japan

[21] Appl. No.: 648,096

[22] Filed: Sep. 7, 1984

[30] Foreign Application Priority Data

Sep. 8, 1983 [JP] Japan .................................. 58-166158

[51] Int. Cl.$^4$ ........................ G11B 5/62; C08K 3/26
[52] U.S. Cl. ..................................... 523/181; 523/220; 524/425; 524/447; 524/605; 528/272; 528/275; 528/308.1; 528/308.3; 428/338; 428/480
[58] Field of Search ................ 523/181, 220; 524/425, 524/447, 605; 528/275, 308.1, 308.3, 272; 428/338, 480

[56] References Cited

U.S. PATENT DOCUMENTS

| | | | |
|---|---|---|---|
| 3,669,931 | 6/1972 | Annis et al. | 524/445 |
| 3,821,156 | 6/1974 | Farrar | 523/181 |
| 4,052,356 | 10/1977 | Breitenfellner et al. | 524/447 |
| 4,138,386 | 2/1979 | Motegi et al. | 523/181 |
| 4,264,372 | 4/1981 | Graves | 524/447 X |
| 4,454,312 | 6/1984 | Kuze et al. | 528/308.1 X |

*Primary Examiner*—Joseph L. Schofer
*Assistant Examiner*—Fred M. Teskin

[57] ABSTRACT

An oriented polyester film comprising ethylene terephthalate as the major repeating unit, which comprises particles of kaolinite and calcium carbonate uniformly dispersed therein, said kaolinite and said calcium carbonate having each an average particle size of 0.05 to 0.8 micron and being contained in such amounts as satisfying the following equations:

$$70 \leq D \times A \leq 1000 \tag{I}$$

$$1000 \leq A + B \leq 10000 \tag{II}$$

$$0.1 \leq B/A \leq 25 \tag{III}$$

wherein D is an average particle size (micron) of calcium carbonate, A is a content (ppm) of calcium carbonate and B is a content (ppm) of kaolinite, said oriented polyester film being excellent in flatness, slipperiness, abrasion resistance, etc. with a small number of coarse particles.

9 Claims, No Drawings

ORIENTED POLYESTER FILM CONTAINING CALCIUM CARBONATE AND KAOLINITE

The present invention relates to production of an oriented polyester film. More particularly, it relates to production of an oriented polyester film which is excellent in flatness, slipperiness, abrasion resistance, etc. and has a relatively small number of coarse particles.

In general, polyester films such as polyethylene terephthalate films are excellent in various physical and chemical characteristics and used as base films for magnetic recording tapes, films for photography, films for condensers, films for packaging, etc. For these uses, polyester films are required to be sufficient in flatness, slipperiness, abrasion resistance, etc., because these properties afford a serious influence on the workability in film production and the quality of the produced films.

Particularly when a polyester film is used for manufacture of a magnetic recording tape, it should have good slipperiness and high abrasion resistance. In case of these properties being inferior, for instance, friction and abrasion are remarkable between the film surface and a coating roller on application of a magnetic coating composition onto the film surface so that wrinkles and scuff marks are much produced at the film surface. Further, for instance, the resulting magnetic recording tape moves slidably in close contact with a guide roll, a reproduction head, etc., and friction and abrasion are so great that scuff marks and strain are readily produced. Sometimes the film surface is scraped off to afford white powders. These may cause production of drop-out.

In order to enhance the slipperiness and abrasion resistance of a polyester film, minute projections are formed at the surface of the film so as to decrease the contact area of the film with a guide roll. Formation of said projections may be accomplished, for instance, by a procedure wherein insoluble particles are separated out from the catalyst residue as the result of polymerization, a procedure wherein inactive inorganic particles are incorporated into the polymeric material, etc. Usually, particles having a larger particle size produce higher enhancement of slipperiness.

When, however, the number of coarse particles (i.e. the content of particles of larger size) in a polyester film is great, the breakage of the film during its manufacture is increased with lowering of workability. In case of a magnetic recording tape, particles of larger size in the film afford larger projections in the magnetic layer, and spacing loss is produced between the magnetic recording tape and a magnetic recording head during the running, whereby the lack of magnetic signals, i.e. dropout, is caused. It is thus desired that the number of coarse particles in the film is decreased so as to make the projections as minute as possible.

As a result of the extensive study to provide an oriented polyester film, which is excellent in flatness, slipperiness and abrasion resistance with a small number of coarse particles and particularly suitable for preparation of a magnetic recording tape, it has been found that the incorporation of certain amounts of kaolinite and calcium carbonate of certain particle sizes into the polyester film can attain said purpose.

According to the present invention, there is provided an oriented polyester film comprising ethylene terephthalate as the major repeating units, which comprises particles of kaolinite and calcium carbonate uniformly dispersed therein, said kaolinite and said calcium carbonate having each an average particle size of 0.05 to 0.8 micron and being contained in such amounts as satisfying the following relationships:

$$70 \leq D \times A \leq 1000 \qquad (I)$$

$$1000 \leq A + B \leq 10000 \qquad (II)$$

$$0.1 \leq B/A \leq 25 \qquad (III)$$

wherein $D$ is an average particle size (micron) of calcium carbonate, $A$ is a content (ppm) of calcium carbonate and $B$ is a content (ppm) of kaolinite.

The oriented polyester film of the invention is excellent in flatness, slipperiness and abrasion resistance so that production of scuff marks and white powders is markedly suppressed. The number of coarse particles contained therein is small. Thus, the film is quite suitable for the use as a base film for magnetic recording medium.

It is known to incorporate two different kinds of inert inorganic particles into a polymeric film so as to improve the slipperiness and abrasion resistance at the film surface. It is also known that the combined use of kaolinite of small particle size and calcium carbonate of large particle size is particularly effective. While such conventional procedure is surely effective in enhancement of slipperiness and abrasion resistance, it cannot achieve high flatness at the surface and keep the number of coarse particles small. By adoption of the conditions as defined above, this invention has succeeded in attaining not only good slipperiness and high abrasion resistance but also high flatness with a small number of coarse particles.

The polyester constituting the film of the invention may comprise as the major or essential repeating unit not less than 80 mol % of ethylene terephthalate and as the optional repeating unit not more than 20 mol % of at least one of dicarboxylic acids, diols and oxycarboxylic acids copolymerizable therewith. The film may be anyone as uniaxially stretched or biaxially stretched. Usually, a biaxially stretched one is favorable.

As the kaolinite, anyone having an average particle size as above defined may be used. Likewise, calcium carbonate may be anyone insofar as the average particle size is as defined above. Specific examples of the calcium carbonate are heavy-duty calcium carbonate, lightduty calcium carbonate, colloidal calcium carbonate, etc. These particles may be optionally treated at the surfaces. Further, they may be incorporated with a dispersing aid and/or a coagulation inhibitor, when desired.

The average particle size of each of kaolinite and calcium carbonate is within a range of 0.05 to 0.8 micron, preferably of 0.1 to 0.5 micron, more preferably of 0.2 to 0.5 micron. In case of less than 0.05 micron, the improving effect of slipperiness and abrasion resistance is insufficient. In case of more than 0.8 micron, slipperiness and abrasion resistance are no more enhanced, and the flatness at the surface is deteriorated. In addition, the number of coarse particles is unfavorably increased.

The average particle size of kaolinite may be substantially the same as or different from that of calcium carbonate. When their particle sizes are different, that of kaolinite or calcium carbonate may be larger than that of the other. However, it is usually preferred that the average particle size of kaolinite is nearly equal to or larger than that of calcium carbonate, because the flatness is higher and the number of coarse particles is smaller.

The term "average particle size" as herein used is intended to mean the particle size of the equivalent spherical particle size distribution as calculated according to the Stokes' formula at 50% integration.

For obtaining the desired average particle size, kaolinite or calcium carbonate as commercially available may be pulverized by a per se conventional procedure to make uniform powders or a uniform slurry, optionally followed by sieving.

The content of calcium carbonate (A) is to be decided in conjunction with its average particle size (D) as specified by the equation (I); namely, the product of (A) and (D) should be within a range of 70 to 1000, preferably of 100 to 800. When the product is less than 70, improvement of slipperiness and abrasion resistance is insufficient. When the product is beyond 1000, the particles are agglomerated so that the number of coarse particles is unfavorably increased. The content of kaolinite (B) is to be decided in conjunction with that of calcium carbonate (A). As shown in the equation (II), the total content of (A) and (B) lies within a range of 1,000 to 10,000 ppm, preferably of 2,000 to 6,000 ppm. When the total content is less than 1,000 ppm, the improvement of slipperiness and abrasion resistance is not sufficient. When it exceeds 10,000 ppm, slipperiness and abrasion resistance are no more enhanced. In addition, flatness is deteriorated, and the number of coarse particles is increased. The proportion of (B)/(A) should be, as shown in the equation (III), within a range of 0.1 to 25, preferably of 0.2 to 20. When it is less than 0.1, abrasion resistance is lowered. When it exceeds 25, the number of coarse particles is unfavorably increased.

Kaolinite and calcium carbonate may be incorporated into a polyester, of which the oriented film is made, at any stage on the manufacture of the polyester or its film, and it is particularly preferred to carry out the incorporation prior to completion of the initial condensation. On the incorporation, kaolinite and calcium carbonate may be in a slurry state or a powdery state. For prevention of fly as well as enhancement of supply precision or uniformity, the incorporation in a slurry state is favored. The slurry state may be accomplished by uniform dispersion so as to reproduce the original primary particles as much as possible. Incorporation of kaolinite and calcium carbonate may be performed separately or simultaneously. The most preferred is to combine a slurry of kaolinite and a slurry of calcium carbonate together and add the resultant uniform slurry to the reaction system for manufacture of the polyester, because the number of coarse particles will be lowered thereby. Further, the polyester containing kaolinite and the polyester containing calcium carbonate may be produced separately, followed by combining them together to prepare the polyester containing kaolinite and calcium carbonate in the contents as defined above.

The polyester may contain inner particles, i.e. fine particles separated out in the course of its manufacture, insofar as the content and particle size of the inner particles do not result in increase of the number of coarse particles and do not deteriorate the flatness at the surface.

Except said incorporation of kaolinite and calcium carbonate, the production of the polyester and the manufacture of the film may be accomplished by per se conventional procedures. Stretching of the shaped film may be also accomplished by a per se conventional procedure.

The oriented film of the invention is suitable for preparation of a film usable in various fields including electrical field, photographic field, etc. It is particularly preferred for manufacture of a magnetic recording tape.

Practical and presently preferred embodiments of the invention are illustratively shown in the following Examples wherein % and part(s) are by weight unless otherwise indicated.

Measurement of the physical properties was carried out in the following manner:

(1) Average particle size:

By the use of a centrifugation type apparatus for measurement of particle size distribution (manufactured by Shimadzu Seisakusho), the equivalent spherical particle size distribution was determined, and the value at 50% integration was taken as the average particle size.

(2) Surface flatness:

Using a surface roughness measuring apparatus of Surfcom 300 A type, the centerline average roughness ($R_A$) was determined under the following conditions: diameter of needle, 1 micron; loaded weight, 0.07 g; standard length of measurement, 0.8 mm; cut off, 0.08 mm.

(3) Sliding property and abrasion resistance:

A rolled tape made by cutting the test film in a small width was run in contact with a metallic guide roll at a high speed for a long time. The tape tension after passing through the guide roll and the amount of white powders produced at the surface of the guide roll were evaluated on the following criteria:

| Grade | |
|---|---|
| | (Sliding property) |
| 1 | Large tension (many scuff marks) |
| 2 | Slightly large tension (considerable scuff mark) |
| 3 | Moderate tension (slight scuff marks) |
| 4 | Slightly small tension (no material scuff mark) |
| 5 | Small tension (no scuff mark) |
| | (Abrasion resistance) |
| 1 | Large amount of white powders |
| 2 | Considerable amount of white powders |
| 3 | Slight amount of white powders |
| 4 | No material amount of white powders |
| 5 | None |

(4) Content of coarse particles:

A small amount of the test film was interposed between two cover glasses and melt-pressed at 280° C. Immediately after cooling, observation was made by the use of a phase contrast microscope, and the number of particles having a maximum size of not less than 5 microns within the visible field was counted by the aid of an image analyzer "Luzex 500" manufactured by Nippon Regulator K.K. The particle number was evaluated on the basis of the following criteria:

| Grade | |
|---|---|
| 1 | Not less than 11 particles/4.8 mm$^2$ |
| 2 | 4-10 particles/4.8 mm$^2$ |
| 3 | 0-3 particle(s)/4.8 mm$^2$ |

EXAMPLE 1

Using a reaction apparatus for continuous esterification comprising two mixing tanks equipped each with a stirrer, a condenser, an inlet for supply and an outlet for discharge, the esterification was carried out.

A slurry of terephthalic acid in ethylene glycol having a molar ratio of ethylene glycol/terephthalic acid of 1.7 and containing antimony trioxide (289 ppm in terms of antimony atom per each terephthalic acid unit) was supplied continuously to the first mixing tank for the first esterification wherein the esterification product existed. Simultaneously, a solution of magnesium acetate tetrahydrate in ethylene glycol and a solution of sodium acetate in ethylene glycol were continuously supplied thereto respectively at rates of 100 ppm (in terms of Mg atom) and of 10 ppm (in terms of Na atom) per each polyester unit in the reaction mixture passing through said mixing tank. The reaction was carried out at a temperature of 255° C. under the atmospheric pressure with an average retention time of 4.5 hours.

The reaction mixture was continously discharged from the first mixing tank and then supplied to the second mixing tank for the second esterification. Ethylene glycol (0.5 part), an ethylene glycol solution of trimethyl phosphate (64 ppm in terms of P) and an ethylene glycol slurry containing kaolinite (average particle size, 0.36 micron; 2,000 ppm) and calcium carbonate (average particle size, 0.32 micron; 2000 ppm) per each polyester unit in the reaction mixture passing through the second mixing tank were continuously supplied thereto. The reaction was carried out at a temperature of 260° C. under the atmospheric pressure with an average retention time of 5.0 hours.

The resulting esterification product was continuously supplied to a two stage reaction apparatus for continuous polycondensation equipped with a stirrer, a condenser, an inlet for supply and an outlet for discharge, and polycondensation was carried out to give a polyester having an intrinsic viscosity of 0.620.

The polyester thus produced was melt-extruded at a temperature of 290° C., and the extruded film was stretched at 90° C. with a stretch ratio of 3.5 in machine direction and at 130° C. with a stretch ratio of 3.5 in transverse direction, followed by heat treatment at 220° C. to obtain an oriented film of 15 microns in thickness. The physical characteristics of the oriented film are shown in Table 1, from which it is understood that the oriented polyester film is satisfactory in all the characteristics including flatness, slipperiness, abrasion resistance and small number of coarse particles.

COMPARATIVE EXAMPLE 1

In the same manner as in Example 1 but not using calcium carbonate, the oriented film was prepared, of which the physical characteristics are shown in Table 1. From the results, it is understood that the oriented film is extremely poor in slipperiness and inferior in abrasion resistance.

COMPARATIVE EXAMPLE 2

In the same manner as in Example 1 but not using kaolinite, the oriented film was prepared, of which the physical characteristics are shown in Table 1. From the results, it is understood that the oriented film has a great number of coarse particles and is inferior in abrasion resistance.

EXAMPLE 2 TO 5 AND COMPARATAIVE EXAMPLES 3 TO 7

In the same manner as in Example 1 but changing the amounts and average particle sizes of kaolinite and calcium carbonate, the oriented films were prepared, of which the physical characteristics are shown in Table 1. From the results, it is understood that the oriented films of the invention are much superior to those for comparison in all the characteristics including flatness, slipperiness, abrasion resistance and number of coarse particles.

TABLE 1

| | Kaolinite | | Calcium carbonate | | | | | | | |
| | Average particle size (micron) | Amount (ppm) (B) | Average particle size (micron) (D) | Amount (ppm) (A) | D × A | B/A | Flatness $R_A$ (micron) | Slipperiness (Grade) | Abrasion resistance (Grade) | Number of course particles (Grade) |
| --- | --- | --- | --- | --- | --- | --- | --- | --- | --- | --- |
| Example | | | | | | | | | | |
| 1 | 0.36 | 2000 | 0.34 | 2000 | 680 | 1 | 0.020 | 5 | 5 | 3 |
| 2 | 0.50 | 2500 | 0.50 | 180 | 90 | 14 | 0.023 | 5 | 5 | 3 |
| 3 | 0.50 | 1000 | 0.34 | 1500 | 510 | 0.7 | 0.019 | 5 | 5 | 3 |
| 4 | 0.36 | 4000 | 0.34 | 1000 | 340 | 4 | 0.018 | 5 | 5 | 3 |
| 5 | 0.36 | 4000 | 0.56 | 200 | 112 | 20 | 0.021 | 5 | 5 | 3 |
| Comparative | | | | | | | | | | |
| 1 | 0.36 | 2000 | — | — | — | — | 0.015 | 1 | 3 | 3 |
| 2 | — | — | 0.34 | 2000 | 680 | — | 0.017 | 5 | 3 | 1 |
| 3 | 0.36 | 2000 | 0.34 | 180 | 61 | 11 | 0.016 | 2 | 4 | 3 |
| 4 | 0.36 | 2000 | 0.34 | 3500 | 1190 | 0.6 | 0.029 | 5 | 5 | 1 |
| 5 | 0.36 | 150 | 0.34 | 2000 | 680 | 0.08 | 0.017 | 5 | 4 | 2 |
| 6 | 0.50 | 5400 | 0.50 | 180 | 90 | 30 | 0.032 | 5 | 5 | 2 |
| 7 | 0.36 | 4000 | 0.85 | 200 | 170 | 20 | 0.027 | 5 | 5 | 1 |

What is claimed is:

1. An oriented polyester film comprising ethylene terephthalate as the major repeating unit, which comprises particles of kaolinite and calcium carbonate uniformly dispersed therein, said kaolinite and said calcium carbonate having each an average particle size of 0.05 to 0.8 micron and being contained in such amounts as satisfying the following relationships:

$$70 \leq D \times A \leq 1000 \qquad (I)$$

$$1000 \leq A + B \leq 10000 \qquad (II)$$

$$0.1 \leq B/A \leq 25 \qquad (III)$$

wherein D is an average particle size (micron) of calcium carbonate, A is a content (ppm) of calcium carbonate and B is a content (ppm) of kaolinite; said film including not more than 3 coarse particles per 4.8 mm$^2$.

2. The film according to claim 1, wherein the average particle size of kaolinite is not smaller than that of calcium carbonate.

3. The film according to claim 1, wherein kaolinite and calcium carbonate have each an average particle size of 0.1 to 0.5 micron.

4. The film according to claim 3, wherein kaolinite and calcium carbonate have each an average particle size of 0.2 to 0.5 microns.

5. The film according to claim 1, wherein the average particle size of calcium carbonate and the content of calcium carbonate satisfy the following relationship:

$$100 \leq D \times A \leq 800 \qquad (I')$$

6. The film according to claim 1, wherein the content of calcium carbonate and the content of kaolinite satisfy the following relationship:

$$2000 \leq A + B \leq 6000 \qquad (II')$$

7. The film according to claim 1, wherein the content of calcium carbonate and the content of kaolinite satisfy the following relationship:

$$0.2 \leq B/A \leq 20 \qquad (III')$$

8. The film according to claim 1, which is a biaxially stretched film.

9. The film according to claim 1, which is used as a base film for magnetic recording tape.

* * * * *